(12) United States Patent
Gahm et al.

(10) Patent No.: US 10,637,923 B2
(45) Date of Patent: Apr. 28, 2020

(54) CONGESTION AWARE LOAD BALANCING FOR DISTRIBUTED STORAGE

(71) Applicant: Cisco Technology, Inc., San Jose, CA (US)

(72) Inventors: Joshua Gahm, Newtonville, MA (US); Narayan Venkat, Westford, MA (US); David R. Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 15/163,814

(22) Filed: May 25, 2016

(65) Prior Publication Data
US 2017/0346897 A1 Nov. 30, 2017

(51) Int. Cl.
*H04L 29/08* (2006.01)
*H04L 12/803* (2013.01)

(52) U.S. Cl.
CPC ........ *H04L 67/1097* (2013.01); *H04L 47/125* (2013.01); *H04L 67/1002* (2013.01); *H04L 67/32* (2013.01)

(58) Field of Classification Search
CPC ............... H04L 47/125; H04L 67/1002; H04L 67/1097; H04L 67/32
See application file for complete search history.

(56) References Cited

U.S. PATENT DOCUMENTS

| | | | |
|---|---|---|---|
| 2006/0179153 A1* | 8/2006 | Lee | H04L 67/32 709/231 |
| 2008/0155093 A1* | 6/2008 | Dharmistan | H04L 43/0852 709/224 |
| 2010/0036903 A1* | 2/2010 | Ahmad | G06F 9/505 709/202 |
| 2010/0094950 A1* | 4/2010 | Zuckerman | H04L 67/1008 709/213 |
| 2011/0029840 A1* | 2/2011 | Ozzie | G06F 11/1004 714/763 |

OTHER PUBLICATIONS

Mohammad Alizadeh et al., "CONGA: Distributed Congestion-Aware Load Balancing for Datacenters," SIGCOMM'14, Aug. 17-22, 2014, http://dx.doi.org/10.1145/2619239.2626316, 12 pgs.
European Office Action dated Oct. 26, 2017 cited in Application No. 17172949.4, 10 pgs.

* cited by examiner

*Primary Examiner* — Gil H. Lee
(74) *Attorney, Agent, or Firm* — Merchant & Gould P.C.

(57) ABSTRACT

Congestion aware load balancing for distributed storage may be provided. First, a read request for data may be received. The data may have redundancy through coding or through copying. Then it may be determined which K of M possible storage nodes to direct the received read request. K and M may be integers and M may be greater than K. In response to determining which K of M possible storage nodes to direct the received read request, the received read request may be copied into K read requests respectively corresponding to the determined K of M possible storage nodes. The copied K read requests may then be transmitted to the determined respective K storage nodes. And, in response to transmitting the copied K read requests, a client may receive data replies from each of the determined respective K storage nodes.

15 Claims, 3 Drawing Sheets

CONGESTION AWARE LOAD BALANCING FOR DISTRIBUTED STORAGE

TECHNICAL FIELD

The present disclosure relates generally to data storage.

BACKGROUND

A data center is a facility used to house computer systems and associated components, such as telecommunications and storage systems. It generally includes redundant or backup power supplies, redundant data communications connections, environmental controls (e.g., air conditioning, fire suppression) and various security devices. Large data centers are industrial scale operations using as much electricity as a small town.

Data centers have their roots in the huge computer rooms of the early years of the computing industry. Early computer systems, complex to operate and maintain, required a special environment in which to operate. Many cables were necessary to connect all the components and methods to accommodate and organize these were devised, such as standard racks to mount equipment, raised floors, and cable trays (installed overhead or under the elevated floor). A single mainframe required a great deal of power, and had to be cooled to avoid overheating.

One of the components within data centers is the storage used by the computing systems. One approach is to store data on a multitude of computer systems, such that they behave as one storage system although data is distributed between them. These are called distributed storage systems.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
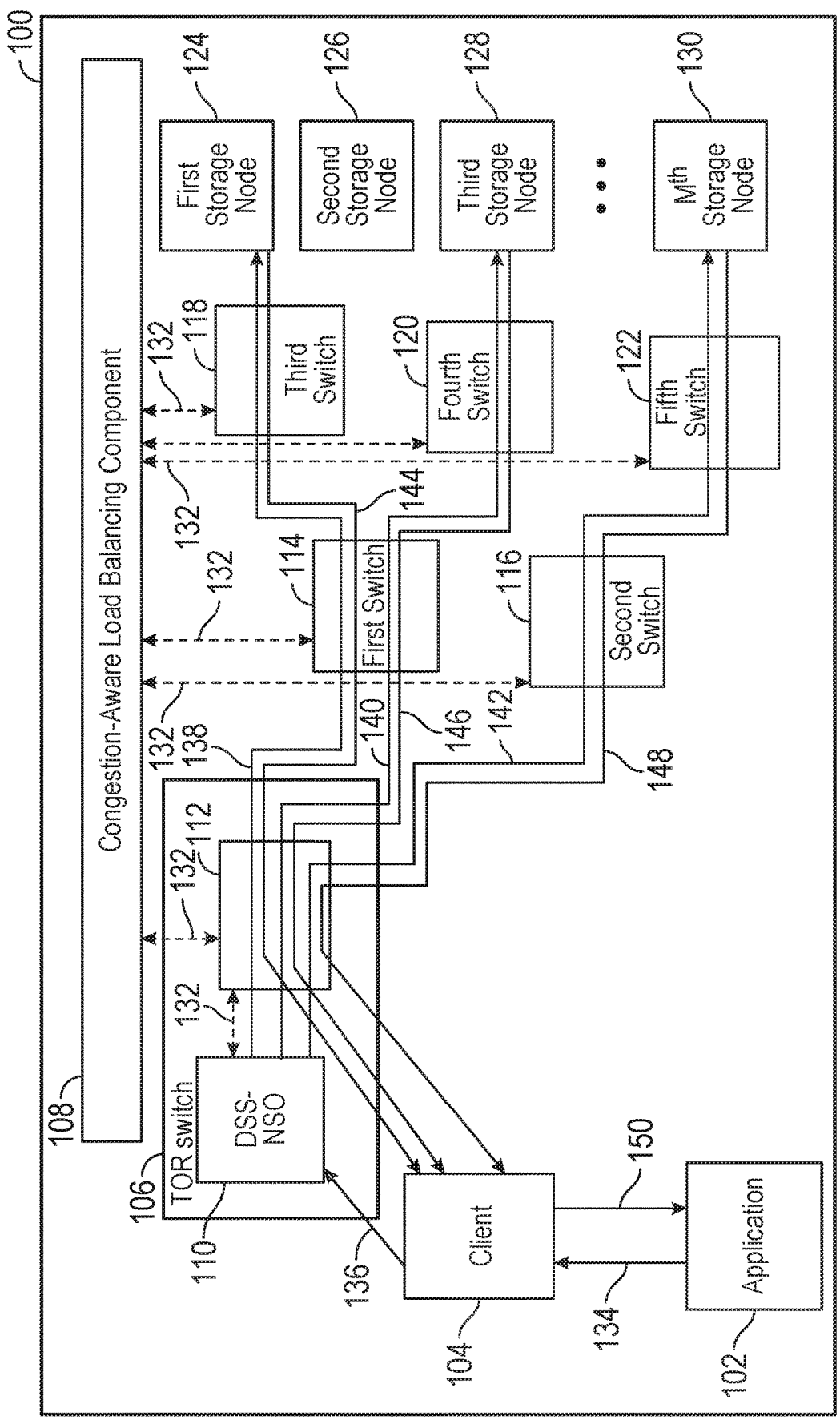
FIG. 1 is a block diagram of a data center for providing congestion aware load balancing for distributed storage.

Congestion aware load balancing for distributed storage may be provided. First, a read request for data may be received from an application or other system entity such as a file system. The data may have redundancy through coding or through copying. Then it may be determined which K of M possible storage nodes to direct the received read request. K and M may be integers and M may be greater than K. In response to determining which K of M possible storage nodes to direct the received read request, the received read request may be copied into K read requests respectively corresponding to the determined K of M possible storage nodes. The copied K read requests may then be transmitted to the determined respective K storage nodes. And, in response to transmitting the copied K read requests, a client may receive data replies from each of the determined respective K storage nodes.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a method, in a data center, for congestion-aware steering of read requests for copied or coded data to K of M possible storage nodes. A system consistent with embodiments of the discourse may be built utilizing a pre-existing congestion-aware load balancing scheme. Embodiments of the disclosure may allow existing network load-awareness to drive selection of storage nodes used to satisfy a read request as well. Since reads from distributed storage in a data center constitute a large portion of traffic on the data center network, load-aware selection of storage nodes may help to improve overall network load balancing beyond what can be accomplished with only load-aware path selection between pre-determined endpoints. In addition, embodiments of the disclosure may allow anticipated bandwidth for future reads of distributed storage to be fed forward into near-term, future load-balancing decisions on the network fabric in the data center.

Distributed storage systems may store redundant data while placing it to achieve durability, availability, and application load balancing goal. Redundancy may be achieved through copying or through coding techniques, such as erasure codes or network coding techniques such as random linear codes.

When a client wants to read data from a distributed storage system that includes redundant data, there may be multiple choices as to which nodes it may read from. For example, if the requested data are copied to three nodes, the client may read from any of the three copies. If the data are stored using a K of M erasure code, the client may read from any K of the M nodes storing fragments of the encoded data.

When the network connecting the client and the storage nodes is in heavy use, it may be desirable to choose among the available copies or data fragments so that the return flows, from the storage nodes to the client, travel along the least congested paths. Embodiments of the disclosure may provide a solution that: (i) may adapt quickly to changing network conditions; (ii) may keep network state awareness within the network so as not to complicate client, application, or host software; and (iii) may permit the load-balancing decisions for the distributed storage reads to be fed forward into an overall congestion-aware load-balancing scheme so that current load balancing decisions may take account of read responses that may happen in the near future. Embodiments of the disclosure may provide a K of M, congestion-aware load balancing scheme for read operations in a distributed storage system that may meet the above goals.

Systems consistent with embodiments of the disclosure may pre-suppose a data-center network with an existing congestion-aware load balancing scheme, such as CONGA. The system may augment the existing load balancing scheme for selection of read data sources and may also feed the selected read source decisions forward into the load balancing scheme so that future congestion can be properly accounted for and mitigated. Embodiments of the disclosure may not depend on the particulars of the pre-existing load balancing scheme, though the manner in which embodiments of the disclosure may be integrated into a system may.

Redundant storage using copying may not be distinguished from redundant storage using erasure coding or network coding. Reading a copied data set may be thought of as an "M choose 1" whereas reading from, for example, a Reed Solomon (K, M) erasure code is "M choose K". Clients may follow different procedures to use the received data (decode it or not and how to decode it) depending on whether erasure coding, network coding, or copying is in use.

Consistent with embodiments of the disclosure, a client may refer to an end system, which may be located within a data center and which may read and reassemble coded or copied storage into a portion of the original, stored data set. In some cases, the client may not be an actual application or system that originally requested the data. For example, in a system with coded data, a read request may pass through a decoder, decompression, or decryption engine that may be physically separated from the application originally initiating a request for the data. In these cases, the client may comprise a system that may read from the storage nodes and perform processing before passing the result back to an originating application.

While embodiments of the disclosure may be described in terms of a single read issued by a single client, in a data center environment, many such read operations may be in progress from many clients at any given time. Also, although reads from storage may constitute a significant proportion of the traffic on the data center network, there may also be many other types of traffic on the network.

When coding is in use, there may be differences depending on whether the coding scheme is systematic or nonsystematic (i.e., on whether some of the coded portions may comprise the original data or whether all portions are coded). For example, if a systematic Reed Solomon (10, 14) code is used, then 10 of the 14 stored fragments of the file, called the systematic portions, may comprise the original data, chopped into 10 parts. When reading data from a file encoded in this way, there may be a strong preference for reading the systematic portions in normal cases and using the coded portions (the other 4 stored portions of the file) only when the systematic portions are unavailable. Even with systematic codes, however, it may be possible to recover the original data by reading any K of the M available fragments, even though the K systematic fragments may be preferred. For example, any K of the M available fragments of the file may satisfy the request equally well. K and M may be integers and M may be greater than K. This may be true for non-systematic codes (e.g., random linear network codes). Considerations for systematic codes may be described in greater detail below.

FIG. 1 is a block diagram of a data center 100 including a network in accordance with embodiments of the disclosure. As shown in FIG. 1, data center 100 may comprise an application 102, a client 104, a top-of-rack (ToR) switch 106, and a congestion-aware load balancing component 108. ToR switch 106 may comprise a distributed storage system node selection optimizer (DSS-NSO) 110 and ToR switch switching elements 112. In addition, data center 100 may comprise a plurality of switches and a plurality of storage nodes. The plurality of switches may comprise a first switch 114, a second switch 116, a third switch 118, a fourth switch 120, and a fifth switch 122. The plurality of storage nodes may comprise a first storage node 124, a second storage node 126, a third storage node 128, and an $M^{th}$ storage node 130. In addition, data center 100 may comprise a plurality congestion information pathways 132 between congestion-aware load balancing component 108 and other elements of data center 100. While FIG. 1 shows four storage nodes (e.g. first storage node 124, second storage node 126, third storage node 128, and $M^{th}$ storage node 130), embodiments of the disclosure may comprise any number of storage nodes and is not limited to four.

An application read data request 134 may be provided from application 102 to client 104. A client read data request 136 may be sent from client 136 to DSS-NSO 110. A plurality of read data request pathways may extend through data center 100 from DSS-NSO 110 to the plurality of storage nodes over the network. The plurality of read data request pathways may include, but are not limited to, a first read data request pathway 138, a second read data request pathway 140, and a third read data request pathway 142. In addition, a plurality of data reply pathways may extend through data center 100 from the plurality of storage nodes to client 104 over the network. The plurality of data reply pathways may comprise, but are not limited to, a first data reply pathway 144, a second data reply pathway 146, and a third data reply pathway 148. A data reply 150 may be sent from client 104 to application 102.

Consistent with embodiments of the disclosure, when client 104 wants to read data from an encoded or copied file, client 104 may send a read request (e.g., client read data request 136) to DSS-NSO 110, which may be located on the path between client 104 and nodes (e.g., the plurality of storage nodes) containing data fragments to be read. DSS-NSO 110 may be located in ToR switch 106 in a rack in which client 104 resides. Also, DSS-NSO 110 may be co-located with network based components responsible for the underlying congestion-aware load balancing scheme (e.g., congestion-aware load balancing component 108) since there may be state sharing between the two. Congestion-aware load balancing component 108 and the DSS-NSO 110, for example, may be located in ToR switch 106, or the DSS-NSO 110 might be located within the congestion-aware load balancing component 108. This component may in turn be distributed among other data center elements, or be centralized in an SDN controller or other element.

Data center 100 may include ToR switches other than ToR switch 106. All ToR switches in data center 100 may contain an instance of a DSS-NSO and each DSS-NSO may be reached at a well-known address (e.g., such as an IP anycast address). In this way, clients can reach the nearest server and may not need to be specially configured based on position within data center 100.

Upon receiving the read request (e.g., client read data request 136), DSS-NSO 110 in ToR switch 106 may copy the single read request from client 104 into K unicast read requests directed to the storage nodes (e.g., the plurality of storage nodes) within data center 100 that contain the corresponding copies or coded fragments of the requested data.

In deciding which K of the M possible nodes will receive the request, DSS-NSO 110 may consider: (i) where in data center 100's topology the M possible choices for the particular data set are located; (ii) which of the M candidate nodes are currently available; (iii) the current and expected near-term future load on the reverse paths (e.g., the plurality of data reply pathways) from each of the M possible choices back to client 104. In this way, DSS-NSO 110 may perform a reverse-path load balancing decision similar to the forward path load balancing that may be done in the operation of the underlying congestion-aware load balancing scheme (e.g., performed by congestion-aware load balancing component 108). The underlying congestion-aware load balancing scheme either already may have sufficient information to make these reverse path load balancing decisions or else may be extended to do so, for example, by reflecting the forward-path load balancing information to the ToR switches at the opposite end of the forward paths.

Upon receiving one of the copied read requests from DSS-NSO 110, each of the K selected storage nodes may reply directly to client 104, providing the requested data. DSS-NSO 110 may include the source address of client 104 in each of the read requests it sends to the storage nodes. DSS-NSO 110 may not be involved in fielding or aggregating the replies from the storage nodes. The replies from the storage nodes to client 104 may be delivered over the plurality of data reply pathways by any conventional transport mechanism, whether through pre-existing TCP connections, SCTP, or other protocols. DSS-NSO 110 may also provide rate pacing advice to the storage nodes to ameliorate incast problems on the ToR-to-client links.

Lost packets anywhere in the sequence may be recovered with application level retries, or may be avoided by delivering the initial requests from client 104 to DSS-NSO 110, from DSS-NSO 110 to the storage nodes, and from the storage nodes to the client over reliable transport connections. However, there may be no state kept on DSS-NSO 110 pertaining to the request once DSS-NSO 110 has forwarded the request to the K selected storage nodes.

In case one of the selected nodes fails to respond to the request, client 104 may contact the missing storage node directly to request the missing data fragments, without going through DSS-NSO 110 again. Or, in case the missing storage node has become unavailable, client 104 may contact a different storage node that was not in the original set of K selected nodes. In order to speed up this process, DSS-NSO 110 may inform client 104 on each request which K nodes have been contacted to provide the requested data. This may be done in an acknowledgment of the original request.

Note also that the load balancing of the read response from each of the selected storage nodes to client 104 may be done independent of the prediction of the load balancing decision that was made when DSS-NSO 110 selected the K target nodes. In other words, DSS-NSO 110 may predict, but may not necessarily enforce the load balancing on the return path. (Extensions might allow the system to enforce or "hint" the paths from the selected storage nodes back to client 104.)

In cases where some or all of the required data may be available to client 104 without going through ToR switch 106, e.g., when a copy is stored on the same node as client 104, client 104 may read the data directly from its local copy without going through ToR switch 106. In case the data are coded and only X of the required K fragments are available locally, client 104 may ask DSS-NSO 110 to supply only the missing K-X fragments, including in the request a list of the fragments that client 104 already has locally so that DSS-NSO 110 may not include any of them in its choices.

DSS-NSO 110 may perform the K of M selection for each read relatively autonomously, at one extreme, or with heavy involvement of higher level Software Defined Network (SDN) controllers at the other extreme. In particular, it is possible that the hardware containing DSS-NSO 110 may have only a simple unicast copying/forwarding capability with no capability to compute optimal choices of K of M nodes on its own. In this case, the programming of the K of M copier element may be performed by an SDN controller, factoring in current load-awareness, either gleaned from the ToR switches or known to the SDN controller by other means.

Figure 2:
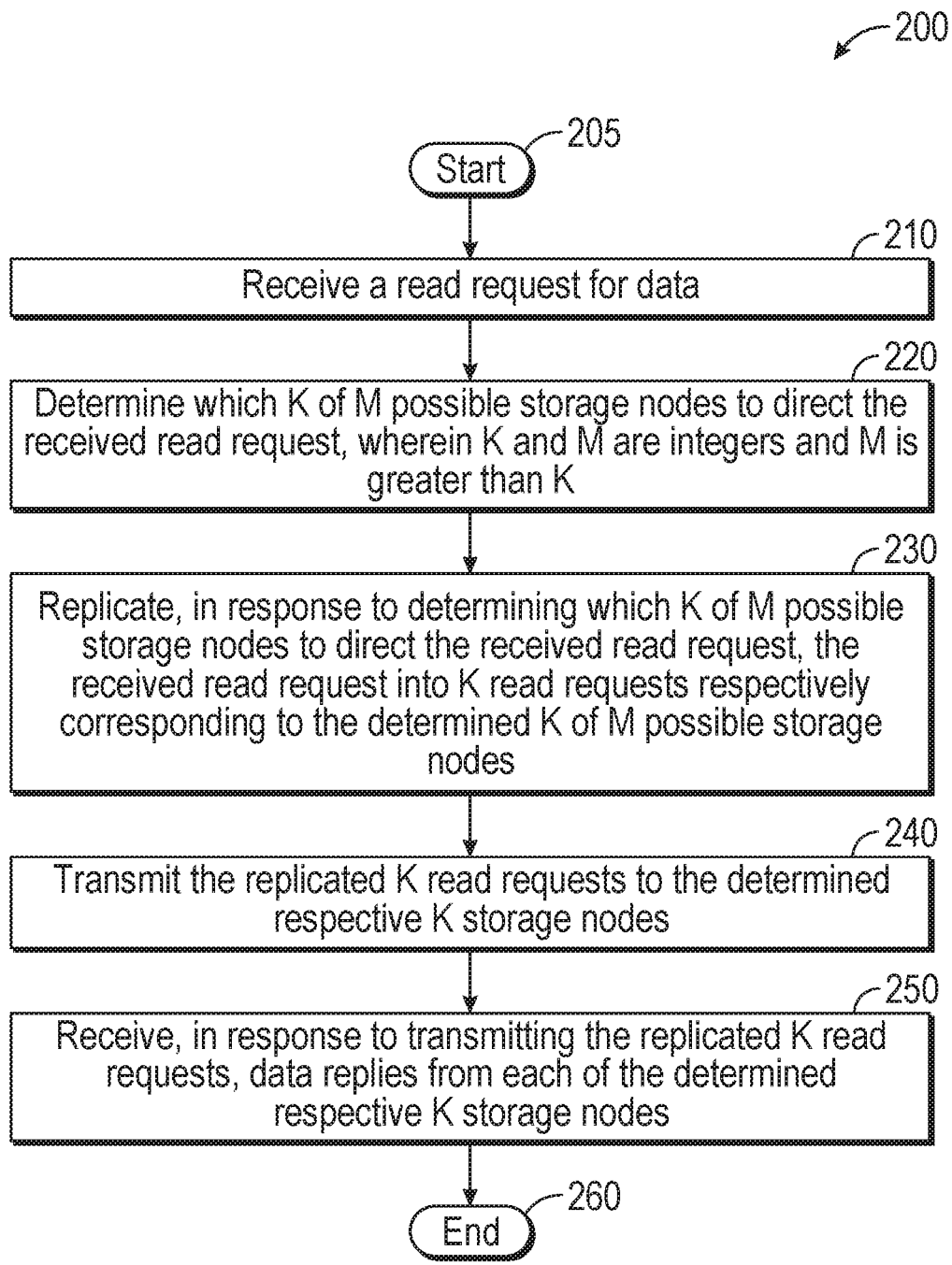
FIG. 2 is a flow chart of a method providing congestion aware load balancing for distributed storage.

FIG. 2 is a flow chart setting forth the general stages involved in a method 200 consistent with an embodiment of the disclosure for providing congestion aware load balancing for distributed storage. Method 200 may be implemented using DSS-NSO 110 and client 104 as described about with respect to FIG. 1. A computing device 300 as described in more detail below with respect to FIG. 3 may comprise a working environment for DSS-NSO 110 and client 104. Ways to implement the stages of method 200 will be described in greater detail below.

Method 200 may begin at starting block 205 and proceed to stage 210 where DSS-NSO 110 may receive a read request for data having redundancy through coding or the read request may be for data having redundancy through copying. For example, application 102 may request data by sending application read data request 134 to client 104. In response, client 104 may send client read data request 136 to DSS-NSO 110.

From stage 210, where DSS-NSO 110 receives the read request (e.g., from client 104), method 200 may advance to stage 220 where DSS-NSO 110 may determine which K of M possible storage nodes to direct the received read request. K and M may be integers and M may be greater than K. In the case where the read request may be for data having redundancy through copying, K may be equal to 1. For example, determining which K of M possible storage nodes to direct the received read request, DSS-NSO 110 may perform a reverse-path load balancing decision comprising determining where in data center 100 the M possible storage nodes (e.g., the plurality of storage nodes) are located. Consistent with embodiments of the disclosure, more than K requests may be issued. In this case, the requests that do not complete by the time the first K complete may be killed.

In addition, DSS-NSO 110 may determine which of the M possible storage nodes (e.g., first storage node 124, second storage node 126, third storage node 128, and M$^{th}$ storage node 130) are available. The reverse-path load balancing decision may comprise DSS-NSO 110 determining a current and an expected near-term future load on data reply pathways from each of the M possible storage nodes. The current and the expected near-term future load on the data reply pathways may be gathered by congestion-aware load balancing component 108 over plurality congestion information pathways 132 and then supplied to DSS-NSO 110 by congestion-aware load balancing component 108 over plurality congestion information pathways 132. For example, K may equal 3 and M may equal 4. Using the current and the expected near-term future load on the data reply pathways, DSS-NSO 110 may determine that first data reply pathway 144, second data reply pathway 146, and third data reply pathway 148 may comprise the best three pathways. Consequently, DSS-NSO 110 may determine that the best K of M possible storage nodes to direct the received read request are first storage node 124, third storage node 128, and M$^{th}$ storage node 130 because they are the storage nodes corresponding to first data reply pathway 144, second data reply pathway 146, and third data reply pathway 148.

Once DSS-NSO 110 determines which K of M possible storage nodes to direct the received read request in stage 220, method 200 may continue to stage 230 where DSS-NSO 110 may copy, in response to determining which K of M possible storage nodes to direct the received read request, the received read request into K read requests respectively corresponding to the determined K of M possible storage nodes.

After DSS-NSO 110 copies the read request in stage 230, method 200 may proceed to stage 240 where DSS-NSO 110 may transmit the copied K read requests to the determined respective K storage nodes. For example, DSS-NSO 110 may: i) transmit a copied read request to first storage node 124 over first read data request pathway 138; ii) transmit another copied read request to third storage node 128 over second read data request pathway 140; and iii) transmit yet another copied read request to $M^{th}$ storage node 130 over third read data request pathway 142.

From stage 240, where DSS-NSO 110 transmits the copied K read requests, method 200 may advance to stage 250 where client 104 may receive, in response to DSS-NSO 110 transmitting the copied K read requests, data replies from each of the determined respective K storage nodes. For example, the data replies may go directly to client 104 and may not pass through DSS-NSO 110. Accordingly, client 104 may: i) receive a data reply from first storage node 124 over first data reply pathway 144; ii) receive a data reply from third storage node 128 over second data reply pathway 146; and iii) receive a data reply from $M^{th}$ storage node 130 over third data reply pathway 148. Client 104 may assemble the received data replies into data reply 150 and send it on to application 102. Once client 104 receives the data replies in stage 250, method 200 may then end at stage 260.

Embodiments of the disclosure may also provide feed forward congestion information. For example, each time DSS-NSO 110 services a read request by selecting K of M possible storage nodes to serve the data, it has the opportunity to "warn" the underlying congestion-aware load balancing scheme (e.g., within congestion-aware load balancing component 108) that return-path data from the selected nodes to the requesting client may be flowing shortly. Moreover, since the size of the read may be specified in the request, DSS-NSO 110 may be able to estimate the size of the response from each selected storage node.

In order to maximize the congestion awareness of the load balancing system, DSS-NSO 110 may feed its predictions for the future load on these return paths (e.g., the plurality of data reply pathways) to client 104 back in to the overall, global congestion model for the system. The mechanisms to accomplish this may depend on the details of the underlying congestion-aware load balancing system.

In cases where there are a large number of read requests that occur almost simultaneously, DSS-NSO 110 could perform a limited search for a solution that optimizes, or partially optimizes, across all the near simultaneous requests. In cases of large, non-latency critical read requests, multiple DSS-NSOs could cooperate to provide jointly optimal or near-optimal solutions across requests from clients in different racks.

In cases where the storage nodes use hard disks drives (i.e., rotating media), the timing of the responses from the individual storage nodes may be unpredictable. This may be true both because of the seek times for the hard disks drives and also because the inherent lack of I/O bandwidth from these devices may mean that congestion within the targeted storage nodes may be common. However, it may be expected that as data storage moves more toward solid state devices, response times for reads may become more predictable, making the feed forward information from DSS-NSO 110 more accurate.

DSS-NSO 110 may be positioned in ToR switch 106 so that it may have ready-access to the congestion information from the fabric, which may be volatile. But in addition to the congestion information, DSS-NSO 110 may also know: (i) the mapping from a target data set to the set of M nodes that contain copies or fragments for that data set; and (ii) which of the M nodes containing the data are currently available. This data may be both small enough and sufficiently stable that DSS-NSO 110 in data center 100 may have an accurate picture of the state of the storage nodes and data sets at all times.

Although there may be many millions of separate data sets stored in data center 100 at any one time, in a distributed storage system, these data sets may be divided into a much smaller number of equivalence classes, each of which may be stored on the same M nodes within data center 100. For example, in a CEPH distributed storage system, each of the stored objects may be assigned to a "placement group" based on a hash of its name, and then the entire placement group is assigned to be stored on M nodes using a stable, algorithmic mapping (called "CRUSH"). Thus the size of the mapping that DSS-NSO 110 may need to learn in order to perform its selection of K of M nodes for each request may be manageable.

Similarly, DSS-NSO 110 in ToR switch 106 may remain aware of storage nodes in data center 100 that may be temporarily unavailable, or that may have become available again after being unavailable for a period of time. As with the copy placement information, the size and volatility of this information may be manageable.

In short, in order for DSS-NSO 110 to make good K of M choices for each read request, it may need the same information about the layout of placement groups and the liveness of nodes as any client of the DSS requires. Since each DSS is designed to make tracking this information manageable for clients, it should also be manageable for DSS-NSO 110. By combining this information with the rapidly changing congestion awareness information in the ToR switches, DSS-NSO 110 may be able to make better load balancing decisions than either the native DSS system or the underlying congestion-aware load balancing could have done on its own.

When client 104 uses the DSS-NSO 110 for a read request, it may not know in advance which K of the M possible storage nodes will be selected. Since the decoding procedure for the returned data depends on which K nodes are selected (in particular because the decoding matrix may be different depending on which nodes are selected), client 104 may eventually learn which of the K nodes have been selected. To obtain this information, client 104 may wait to be contacted by the K selected node, each of which may identify itself to client 104 at that time. Or DSS-NSO 110 may inform client 104 which of the K nodes have been selected. The latter option may also permit the client to obtain the decoding matrix corresponding to the K selected nodes while it waits to receive the data to be decoded.

Consistent with other embodiments of the disclosure, client 104 may maintain mapping of available copies/fragments for its own data set, and to forward this information to DSS-NSO 110 along with its request. In distributed storage systems where client 104 may have access to this information, allowing client 104 to forward the possible copy/fragment choices to DSS-NSO 110 with each request may free DSS-NSO 110 from having to learn and track the layout of copies/fragments and the storage node availability information. In this embodiment, DSS-NSO 110 may still select K of M target nodes to receive the read request and forward the requests on behalf of client 104.

Consistent with other embodiments of the disclosure, DSS-NSO 110, instead of forwarding the read requests to the K of M selected target nodes, may select the best K nodes for the operation and then return the choices in a response to client 104. Client 104 may then be responsible for sending the requests to the selected K of M clients. This embodiment may have the advantage that client 104 could use its normal transport connections with the storage nodes rather than having to rely on triangular message forwarding among client, DSS-NSO and storage nodes.

Consistent with other embodiments of the disclosure, DSS-NSO 110 may be located within client 104. In this embodiment, the underlying congestion aware load balancing scheme (e.g., in congestion-aware load balancing component 108) may provide an interface that would allow client 104 to track the congestion information in a timely fashion.

As described above, when the requested data are stored using a systematic code, there may be a preference to satisfy most read requests using the systematic rather than the coded fragments of the data. In most cases, this may make the disclosure less useful when the data are stored using systematic codes, since there may be effectively no choices as to which storage nodes to contact for normal read requests.

However, even with systematic codes, embodiments of the disclosure may be useful for latency-sensitive reads under conditions of heavy load. In particular, in cases where the network paths (e.g., the plurality of data reply pathways) from the storage nodes containing the systematic fragments are busy, it may make sense to satisfy a latency-critical read request using non-systematic data. While this choice may impose additional decoding cost on client 104, it may be worthwhile for selected, latency-sensitive reads.

Accordingly, embodiments of the disclosure may be used to satisfy latency-critical reads of data stored with a systematic code. In these cases, DSS-NSO 110 may target most read requests to the K nodes storing systematic portions of the data. However, when one or more of the return paths (e.g., the plurality of data reply pathways) is heavily congested and DSS-NSO 110 determines that the congestion is likely to result in a long latency to satisfy the request, DSS-NSO 110 may instead target the request to some of the storage nodes with non-systematic fragments of the requested data.

Embodiments of the disclosure may be extended to cover writes to distributed storage (e.g., the plurality of storage nodes) as well as reads. For example, when writing a file or changes to a file to a distributed storage system with redundancy, all redundant copies and/or coded fragments of the file may be written or updated. However, in many scenarios, there is also an M choose K scenario, due to the fact that some writes may be split into two phases, with the first phase establishing a minimum level of durability and the second phase establishing longer term durability and/or better geographic distribution. For example, if a data set is stored with four copies for durability and load balancing, an initial write to the data set may be acknowledged and assumed to be complete at client 104 after the first two copies have been written. Copying of the data to the two additional copies may be deferred to a background task. In this example, the initial writes to the data set may be treated as a 4-choose-2 problem.

With embodiments of the disclosure, when used for writes, client 104 may request a D of M write selection from DSS-NSO 110, where D is the number of nodes that may be written to in order to achieve first-phase durability. DSS-NSO 110 may respond with a list of selected nodes, and client 104 may then write the copies of the data and/or coded fragments of data directly to the selected nodes. Unlike the read case, when DSS-NSO 110 selects these D target nodes it may use forward-path congestion information. As with the read case, DSS-NSO 110 may feed the anticipated additional load from the writes forward into the overall congestion map.

Writes may also present constraints due to consistency issues. Specifically, if different subsets of nodes are selected for two writes to the same data set, then the storage system may have to ensure that the writes are properly ordered across all copies. This locking/ordering constraint may limit the ability of the congestion-aware load balancing in DSS-NSO 110 to redirect writes in response to highly dynamic load information.

Consistent with embodiments of the disclosure, the underlying infrastructure of congestion awareness running in congestion-aware load balancing component 108 may comprise CONGA. However, embodiments of the disclosure are not so limited and may be implemented with other congestion awareness schemes, some of which may have very different properties from CONGA. For example, CONGA may provide congestion awareness in a limited form in that it may not build a full link-by-link congestion map of the network in data center 100. If another congestion-aware load balancing scheme were to be deployed that does provide full link-by-link congestion awareness, embodiments of the disclosure may also work in that congestion-aware load balancing scheme. For example, the congestion awareness of the topology may be extended to the I/O buses in the storage nodes themselves and/or to the command queue processing capabilities in the storage nodes. Particularly with legacy, rotating media storage, the I/O throughput of the devices themselves may be a bottleneck in overall performance of DSS-NSO 110.

Figure 3:
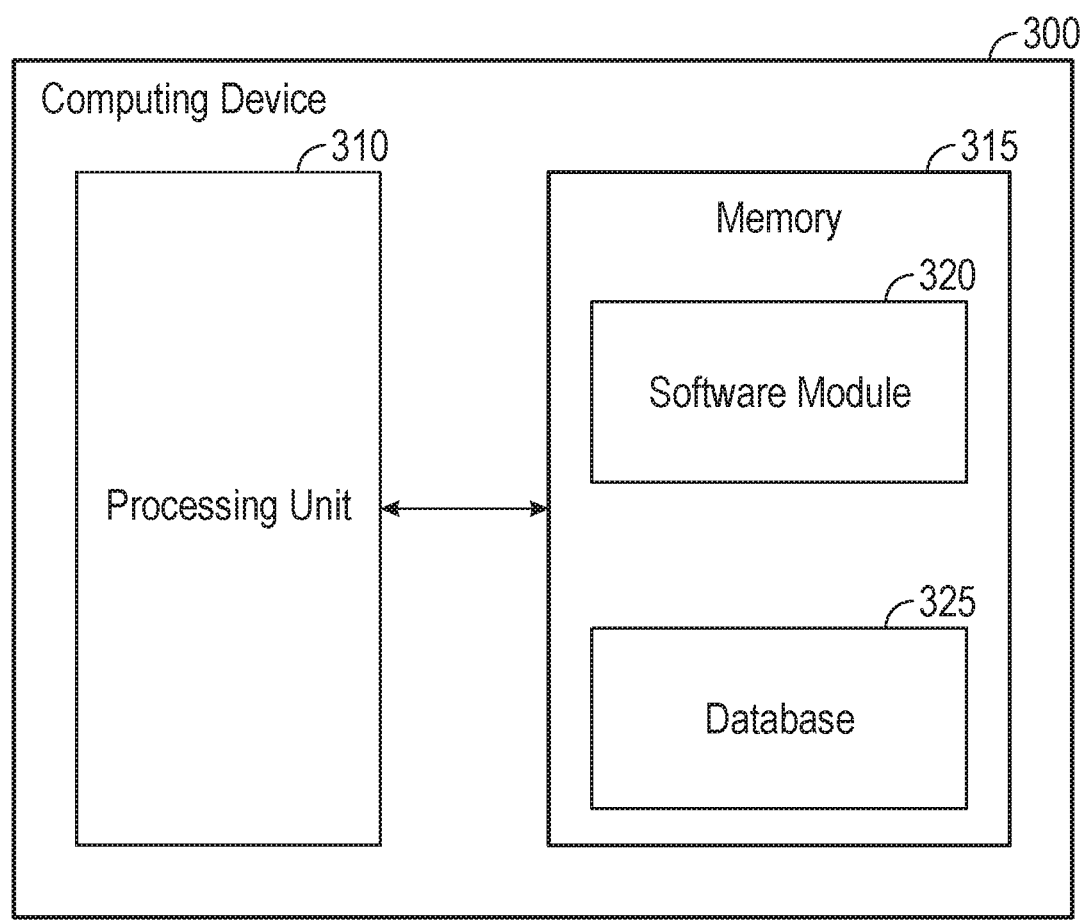
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing congestion aware load balancing for distributed storage, including for example, any one or more of the stages from method 200 described above with respect to FIG. 2. Computing device 300, for example, may provide an operating environment for elements of data center 100 including, but not limited to, DSS-NSO 110 and client 104. DSS-NSO 110 and client 104 may operate in other environments and are not limited to computing device 300.

Computing device 300 may be implemented using a personal computer, a network computer, a mainframe, a router, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a read request for data having redundancy through coding;
determining which K of M possible storage nodes to direct the received read request, wherein K and M are integers and M is greater than K, wherein K is greater than 1, and wherein determining which K of M possible storage nodes to direct the received read request comprises performing a reverse-path load balancing decision comprising:
determining a location of each of M possible storage nodes,
determining availability of each of the M possible storage nodes,
determining a current and an expected near-term future load on data reply pathways from each of the M possible storage nodes to a client originating the read request, and
determining the K of M possible storage nodes based on the determined location of the M possible storage nodes, the availability of the M possible storage nodes, and the current and the expected near-term future load on the data reply pathways from the M possible storage nodes;
copying, in response to determining which K of M possible storage nodes to direct the received read request, the received read request into K read requests corresponding to the K of M possible storage nodes;
transmitting the copied K read requests to the K of M possible storage nodes;
informing the client of the K of M possible storage nodes contacted to provide the requested data in an acknowledgement of the read request, wherein the client, in response to one of the K of M possible storage nodes contacted to provide the requested data becoming unavailable, directly contacts another node which is not one of the K of M possible storage nodes contacted to provide the requested data; and receiving, in response to transmitting the copied K read requests, data replies from the K of M possible storage nodes.

2. The method of claim 1, wherein receiving the read request comprises receiving the read request from the client.

3. The method of claim 1, wherein receiving the read request comprises receiving the read request at a client Distributed Storage System Node Selection Optimizer (DSS-NSO) located between the client from which the read request was received and the K of M possible storage nodes.

4. The method of claim 3, further comprising:
notifying, by the DSS-NSO, the client of the K of M possible storage nodes to direct the received read request; and
providing the client with a decoding matrix prior to the client receiving data replies from each of the K of M possible storage nodes.

5. The method of claim 3, further comprising maintaining, by the client, a mapping of available storage nodes in a data center from which to determine the K of M possible storage nodes to direct the received read request.

6. The method of claim 5, further comprising providing, by the client to the DSS-NSO, the mapping of available storage nodes in the data center.

7. The method of claim 3, further comprising maintaining, by the DSS-NSO, a mapping of available storage nodes in a data center from which to determine the K of M possible storage nodes to direct the received read request.

8. The method of claim 1, wherein receiving the read request comprises receiving the read request at a client Distributed Storage System Node Selection Optimizer (DSS-NSO) located in a Top-of-Rack (ToR) switch.

9. The method of claim 1, wherein performing the reverse-path load balancing decision comprises determining where in a data center the M possible storage nodes are located.

10. The method of claim 1, wherein receiving the data replies from the K of M possible storage nodes comprises receiving the data replies at the client from which the read request was received.

11. The method of claim 1, further comprising feeding load balancing decisions, comprising the K of M possible storage nodes to direct the received read request, into a congestion-aware load balancing component responsible for an underlying congestion-aware load balancing scheme for a data center comprising the K of M possible storage nodes.

12. An apparatus comprising:
a memory storage; and
a processing unit coupled to the memory storage, wherein the processing unit is operative to:
receive a read request for data having redundancy through coding;
determine which K of M possible storage nodes to direct the received read request, wherein K and M are integers and M is greater than K, wherein K is greater than 1, and wherein the processing unit being operative to determine which K of M possible storage nodes to direct the received read request comprises the processing unit being operative to perform a reverse-path load balancing decision comprising:
determining a location of each of M possible storage nodes,
determining availability of each of the M possible storage nodes,
determining a current and an expected near-term future load on data reply pathways from each of the M possible storage nodes to a client originating the read request, and
determining the K of M possible storage nodes based on the determined location of the M possible storage nodes, the availability of the M possible storage nodes, and the current and the expected near-term future load on the data reply pathways from the M possible storage nodes;
copy, in response to determining which K of M possible storage nodes to direct the received read request, the received read request into K read requests corresponding to the K of M possible storage nodes;
transmit the copied K read requests to the K of M possible storage nodes;
inform the client of the K of M possible storage nodes contacted to provide the requested data in an acknowledgement of the read request, wherein the client, in response to one of the K of M possible storage nodes contacted to provide the requested data becoming unavailable, directly contacts a different node which is not one of the K of M possible storage nodes contacted to provide the requested data; and
receive, in response to transmitting the copied K read requests, data replies from each of the K of M possible storage nodes.

13. The apparatus of claim 12, wherein the processing unit being operative to perform the reverse-path load balancing decision comprises the processing unit being operative to perform the reverse-path load balancing decision comprising determining where in a data center the M possible storage nodes are located.

14. The apparatus of claim 12, wherein the read request is received at a client Distributed Storage System Node Selection Optimizer (DSS-NSO) located between the client from which the read request was received and the K of M possible storage nodes, wherein the DSS-NSO maintains a mapping of available storage nodes in the data center from which to determine the K of M possible storage nodes to direct the received read request.

15. The apparatus of claim 14, wherein the DSS-NSO is located in a Top-of-Rack (ToR) switch.

* * * * *